J. N. JACOBS.
FILE CUTTING MACHINE.
No. 19,854.  Patented Apr. 6, 1858.
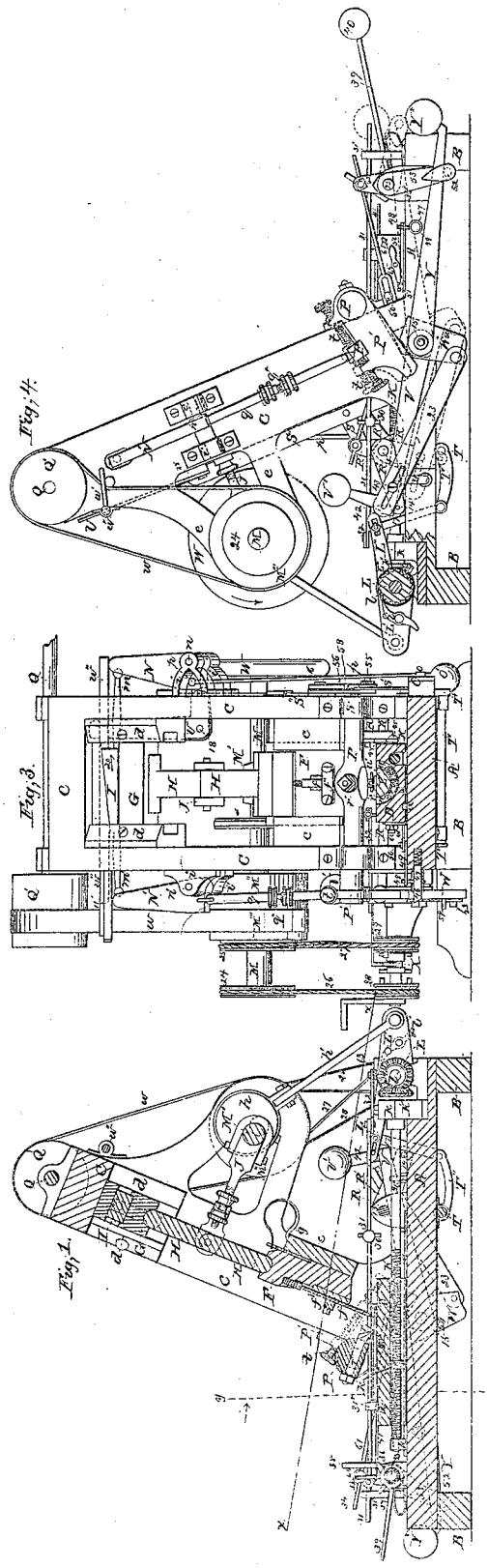
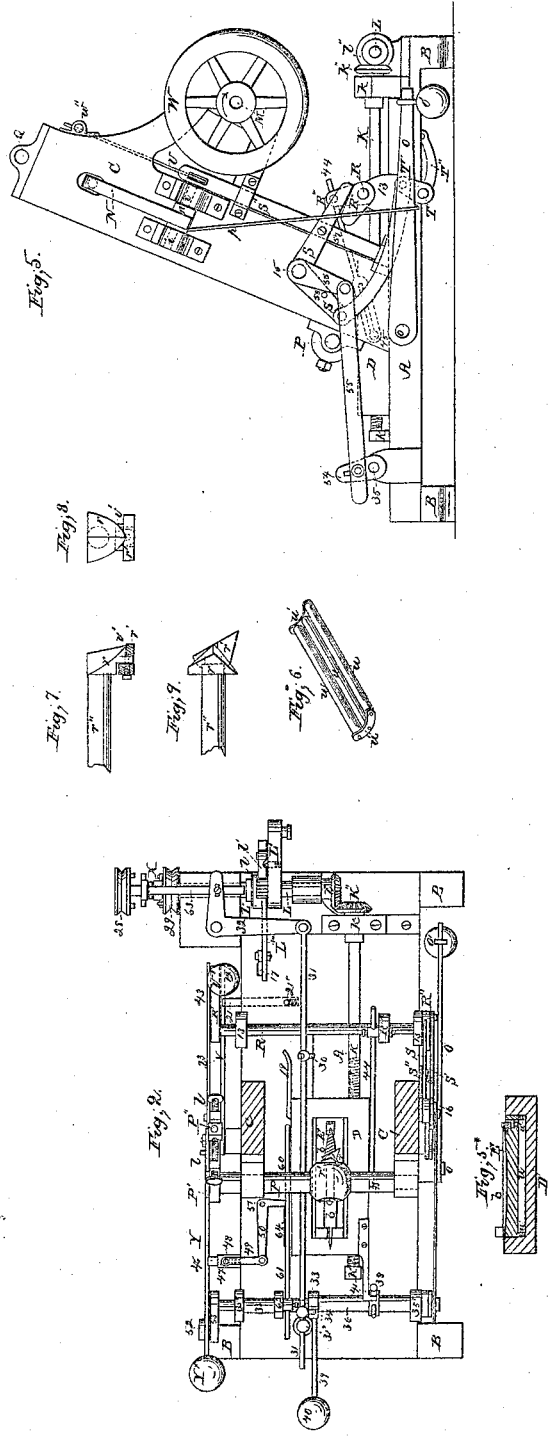

UNITED STATES PATENT OFFICE.

J. NELSON JACOBS, OF WORCESTER, MASSACHUSETTS.

MACHINE FOR CUTTING FILES.

Specification of Letters Patent No. 19,854, dated April 6, 1858.

*To all whom it may concern:*

Be it known that I, J. NELSON JACOBS, of Worcester, in the county of Worcester and State of Massachusetts, have invented certain new and useful Improvements in Machinery for Cutting Files; and I do hereby declare that the following is a full, clear, and exact description of the same, reference being had to the accompanying drawings, making a part of this specification, in which—

Figure 1 is a longitudinal vertical section of a machine with my improvements taken nearly in the center. Fig. 2, is a horizontal section in the line $x$, $x$, of Fig. 1. Fig. 3, is a transverse vertical section, taken in the line $y$, $y$, of Fig. 1, as seen looking in the direction of the arrow near that line. Fig. 4, is a view of that side of the machine at the left hand of Fig. 3; in this view a portion of the machine is supposed to be broken away at the lower left hand corner, to show part of the feed motion. Fig. 5 is an elevation of the opposite side of the machine to that exhibited in Fig. 4. Fig. 5* is a longitudinal section of the rolling bed on which the file is supported and its carriage. Figs. 6, 7, and 8, are detail views which will be found hereinafter explained.

Similar letters of reference indicate corresponding parts in the several figures.

This invention consists chiefly in certain means of controlling the operation of the chisel or cutter so that the depth of every cut may be the same throughout the whole length of the file, notwithstanding the curved form of the faces, or that the successive cuts may be made a gradually increasing or diminishing depth at pleasure.

It also consists in certain means of controlling the position of the file blank during the cutting operation, whereby each cut is caused to be of uniform depth all across the file.

To enable others skilled in the art to make and use my invention I will proceed to describe its construction and operation.

A. B. C, is the framing of the machine consisting of a horizontal bed plate supported on feet B, B, and supporting a stationary frame C, which is inclined at an angle of about from 10° to 25° to the bed plate.

D is a carriage fitted to slide on a track $a$, on the bed plate A, and supporting a rolling bed E, on which the file blank ($b$) rests during the cutting operation.

F is the cutter stock fitted to slide up and down in a guide $c$, $c$, that is cast upon or secured to the sides of the frame C.

$f$, is the cutter or chisel secured rigidly to the front of the stock F by a clamp $f'$, and bearing at its upper end against a screw $f''$, in the stock, which screw serves to adjust it higher or lower.

G, is a crosshead fitted to slide up and down in line or parallel with the cutter stock in guides $d$, $d$, in the upper part of the frame C.

H, H, is a toggle between the cutter-stock F, and crosshead G; and I, is a wedge working transversely between the crosshead G, and the head of frame C, and serving to adjust the crosshead higher or lower.

$g$, is a strong spring secured to the guide $c$, $c$, and connected with the cutter stock F, and serving to hold said stock up to the lower part of the toggle, and the upper part of the toggle against the crosshead G.

M, is the main shaft of the machine working in bearings in brackets $e$, $e$, at the back of the frame C. This shaft carries a fly wheel W, a fast pulley M'', and loose pulley M''', and it is furnished with a crank M', which is connected by a rod J, with the joint ($j$) of the toggle H, H, and which, by the rotary motion of the shaft, (produced by a belt $w$, from a pulley Q', on a shaft Q above the frame C,) is caused through the rod J to operate on the toggle in such a manner as to give a reciprocating motion to the cutter stock to produce the cutting operation. The wedge I serves to adjust the crosshead G, higher or lower, and, as the crosshead is the bearing of the toggle, its adjustment serves to regulate the point to which the cutter is allowed to descend and thus to regulate and vary the depth of cut.

K, is a feed screw, provided with journals which are fitted to stationery bearings $k$, $k$, secured to the bedplate A, said screw being fitted to a nut $k'$, secured to the carriage D, and being geared by a pair of bevel gears $k''$, $l''$, with a shaft L, at the back of the machine. This shaft has firmly secured to it a ratchet wheel $l$ and also has loosely fitted to it a lever L', which carries a pawl $l'$, engaging with the teeth of the ratchet wheel $l$. The lever L' is connected with the rod $h'$, of an eccentric $h$, that is fast upon the main shaft M of the machine; and every revolution of said shaft M communicates through the eccentric and its rod a movement to the lever L', which causes the pawl l', to turn the ratchet wheel l, a short distance, and with it the shaft L, whose bevel gear l'', turns the bevel gear k'', on the feed screw and thus gives motion to the carriage D, in the direction of the arrow 12, shown upon the carriage in Fig. 1, every time the cutter is raised after producing a cut in the file blank, to present the file under the cutter in a position for the next cut. The length of the feed movement of the carriage of course requires to be varied according to the fineness or coarseness of the cut of the file; and this may be done by any of the well-known methods of varying the length of movement in feed apparatuses.

While the longitudinal movement of the file under the cutter and the operation of the cutter proceeds in the manner above described, the wedge I, is operated by the means and in the manner described as follows, to regulate the descent of the cutter-stock that it may be varied to suit the taper and slightly rounded form which most files have in a longitudinal direction, or to suit any other form that it may be desired to give a file in a longitudinal direction, and may cut to a uniform depth from end to end of the file. The wedge I has attached to its butt end a rod m, which passes through an opening in the frame C, and against which always rests a lever N, which works on a fulcrum pin n, that is held in two brackets i, i, at one side of the frame C. This lever N is connected by a rod p, with a lever O, which works on a fulcrum o, near the bottom of the machine and which is loaded with a weight O', that is sufficient to exert force enough on the lever N, to cause it by its pressure against the rod m, to force in the wedge I and thus to depress the crosshead G, if such effect were not counteracted by a pressure against the smaller end of the wedge. To this smaller end of the wedge I, there is attached a rod m', which passes through the opposite side of the frame C, to the rod n, and against which rests a lever N', which works on a fulcrum pin n', that is held in two brackets i', i', at the opposite side of the frame C, to the lever N. This lever N, is held up against the rod m', by a rod q, which rests upon an arm P', that is secured to a shaft P, which is fitted to bearings secured to the front of the frame C. This shaft P has secured to it a foot-piece r, fitted with a steel shoe r', which rests upon the file blank, very near the chisel f, during the cutting operation, and hence the file blank itself, through the agency of the foot piece r, and shoe r', shaft P, arm P', rod q, lever N', and rod m', sustains the wedge in opposition to the pressure produced at its butt end by the loaded lever O, before described. As a thicker or higher portion of the blank comes under the shoe r', and raises it, the arm P' and rod q, are also raised, and the lever N' acted upon so as to cause the rod m', to drive the wedge I outward from between the crosshead G, and the head of the frame C, that is to say, in a direction to allow the crosshead G, to rise; but as a thinner or lower portion of the blank comes under the foot piece, the lever P' is allowed to descend under the effect of the loaded lever O, on the opposite end of the wedge, and the wedge to enter farther between the crosshead and head of the frame C, and to force down the crosshead. Now as the height of the crosshead determines the lowest depression of the chisel, it only requires that this height shall be controlled so as always to bear the same relation to the height of the face of the file blank at or near the part being operated upon, to insure the same depth of cut to be produced by every depression of the chisel. The only adjustment necessary to secure this proper control is provided by fitting the arm P', with a sliding block P'' as a rest for the rod q, said block being adjustable by set screws t, t, and serving to vary the effective length of the arm P'. This sliding block may also be adjusted so that the crosshead may be caused to rise and fall in a greater or less ratio than the rise and fall in the surface of the file blank, and thus produce a gradually increasing or diminishing depth of cut toward either the middle or ends of the file. The general depth of cut may be increased or diminished by shortening or lengthening the rod q, which is made in two parts and with a screw $q^*$ for this purpose. The uniform depth of the cut in a direction transverse to the file, or lengthwise of the chisel, is insured by the employment of the rolling bed E, to support the file blank, and by a peculiar construction of the foot piece r, which will be presently described.

The rolling bed E is made in the form of the segment of a cylinder, and supported as shown in Fig. 3, upon a series of rollers u, u, which rest in a cavity of corresponding form in the carriage D. The rollers u, u, are fitted into a frame, of which a perspective view is given in Fig. 6; said frame being composed of two arc-formed end pieces u', connected rigidly by the axles upon which the rollers are fitted to turn freely. The foot-piece r, and shoe r', are represented in Figs. 7, 8, 9, on a larger scale than in the other figures. Fig. 7 being a longitudinal sectional view, Fig. 8, a front view, and Fig. 9 a plan. The foot-piece r, is secured rigidly in the shaft P by a shank r'', passing through the said shaft, and a screw and nut in front of the shaft, but has the shoe attached to it loosely by a pin v, which allows the shoe to rock on a knife-edge v', at the bottom of the foot-piece in such a manner as to accommodate itself to any rolling of the bed E. The rolling bed and rocking foot-piece allow the face of the file blank to accommodate or adjust itself to the edge of the chisel; so that when said edge of the chisel comes in contact with said face, it is sure to bear equally all across the face, and, if the metal of the file blank is of uniform softness, is sure to cut to a uniform depth all across. In order that the adaptation of the face of the blank to the edge of the chisel may be as near as possible perfect, the knife edge of the foot-piece, upon which the shoe works should be as nearly as possible concentric to the rolling bed.

The ratchet wheel L, and pawl $l'$, by which the carriage D is moved intermittently are only operative during the cutting operation, and a quicker motion is employed to run the carriage forward after either side of the file has been cut and also to run the carriage back again some distance in the direction of the arrow 12. This carriage, it must be stated, moves forward some distance farther than is necessary for the cutting operation in order to allow the partly cut file to be turned over to present a new face to the operation of the chisel, or to allow a finished file to be taken out of the machine and a new blank to be put in without entirely stopping the machine. The ratchet movement is stopped when the carriage has been run back in the direction of the arrow 12, far enough to complete the cutting of a side of the file; and the forward movement and first part of the backward movement are effected by means that will be presently described. When the file has been run back far enough to complete the cutting of one side, the belt $w$, is shifted from the fast pulley M″, to the loose pulley M‴, to stop the rotation of the shaft M, and the operation of the cutter by means of a shipper $w'$, attached to a horizontal sliding rod $w''$, at the back of frame C; said rod deriving the necessary movement for this purpose from a horizontal rockshaft R, which is fitted to work in bearings 13, 13, on the bedplate behind the frame C. This rockshaft R, is furnished with an arm R′, (see Figs. 2 and 4) which carries a stud 14, that is situated under a lever V, which works on a fulcrum 15, on one side of the bedplate A, and which lever is weighted by a weight V′, but, while the carriage is held back and the cutting operation proceeding, is held up out of contact with the stud 14, by a spring sliding bolt 21, which works through a guide in the bedplate, (as shown in Figs. 2 and 4,) and which is provided with an upright stud or knob 21*, (see Fig. 2) standing above the bedplate. The said rockshaft R, also carries a cam R″, (Figs. 2 and 5) upon which always rests one arm of an elbow lever S, which works upon a fulcrum 16, secured to one side of the frame C. The other arm of the lever S is connected by a rod S′, with the arm T′, of the rockshaft T, working in bearings below the bedplate A, which latter rockshaft carries another arm T″, (see Figs. 1 and 5) which is connected by a rod 17, with a lever L‴, which is rigidly attached to a cylindrical sheath L″, which sheath is fitted loosely to the shaft L, and nearly incloses the ratchet wheel ($l$), only having an opening in its periphery large enough for the pawl $l'$, to work through, which opening, when the file is under the cutter, is always in the proper position for the pawl to work through it. That arm of the lever S, which rests on the cam R″, is connected by a pin 57, with a rod S″, which connects with one arm of an elbow lever U, which works on a fulcrum 18, at the back of the frame C, and whose other arm takes hold of the sliding rod $w''$, of the belt shipper $w'$. The carriage B has attached to its rear end a curved plate 19, (Fig. 3) so formed and arranged that just as the said carriage has run almost as far back as desired, it comes in contact with one side of the stud 21*, and, as the movement of the carriage proceeds, draws said stud toward the center of the bedplate and thus draws the projecting end of the bolt 21, from under the loaded lever V, which then drops on the stud 14, of the arm R′, and forces down the said arm, and by so doing turns the rockshaft R, in a direction to throw up the cam R″, and raise the arm of the lever S, that rests upon it, which movement of the lever moves up the rod S′, and operates on the lever U, so that the latter moves the slipper and throws the belt $w$, from the fast to the loose pulley. The above described movement of the lever S, at the same time that it shifts the belt, operates through the rod S′, upon the lower rockshaft T, in such a way as to throw down the arm T″, and draw down the lever L‴, and thus move the ratchet wheel sheath L″, to such a position as to throw the point of the pawl $l'$, out of gear and cover that part of the ratchet wheel upon which the pawl acts. At the same time that the rotation of the main shaft M, is stopped, and the pawl $l'$, thrown out of gear, (by the action of the loaded lever V, on the arm R′, of the rockshaft R,) the wedge I, is driven in the direction of the arrow 20, shown on it in Fig. 1, by means of a rod 23, which connects the aforesaid arm R′, of the rockshaft R, by a slot 42, and pin 43, with a cam W*, that is fitted to turn on the fulcrum 15, of the loaded lever V; said rod, as the arm R′, descends, turning the said cam, which is situated under the arm P′, of the rockshaft P, before described, from the position shown in black outline in Fig. 4, to the position shown in red outline in the said figure, and thus causing said cam to lift up the rod $q$, which by its action on the lever N′, drives the wedge in the direction above specified, and thus allows the spring $g$, to raise the cutter-stock high enough for the cutter to clear the file when it runs forward again. The raising of the arm P′, also causes the shoe $r'$, to be lifted up high enough to prevent it dragging over the teeth of the file as the latter runs forward.

The loose pulley M‴, has attached to it two other pulleys 24, and 25, which are belted (the former by a straight belt 26, and the other by a cross belt 27,) with two independent loose pulleys 28, and 29, which are fitted to the shaft L, so as to be incapable of moving longitudinally thereon. These pulleys 28, and 29, are set in motion in opposite directions as soon as the belt $w$, is shipped on the loose pulley M‴. At the same time that the shipping of the belt, the throwing of the pawl $l'$, out of gear, and the raising up of the chisel, are being effected in the manner just above described, a sliding clutch X, (Figs. 2 and 3) that is fitted to the shaft L, between the pulleys 28, 29, is being moved into gear with the pulley 28, by the carriage coming into contact with a tappet 30, on a horizontal rod 31, which slides in guides 31*, and driving back the said rod, which being connected with the clutch by an elbow lever 32, and rod 63, moves the clutch toward said pulley 28. The pulley being thus geared to the shaft, carries it around in the opposite direction to that in which it was moved by the ratchet movement, and thus reverses the action of the feed screw and runs the carriage rapidly forward. Before this forward motion of the carriage is completed, the rockshaft R, with its arm R′, and cam R″, are returned to the positions they occupied before the fall of the loaded lever V, by the action of a pin 45, attached to the carriage, upon a rod 44, connected with an arm R‴, on said rockshaft; the said pin 45, working in a slot in the said rod 44, and, coming to the front end of the slot, draws forward the arm R‴, and thus moves the rockshaft; but owing to the nature of the connections of said rockshaft with the mechanism to which it gives motion, all of these parts remain for the present *in statu quo*. The carriage, after having run forward, does not stop, but is caused to return again immediately to take the file blank or partly cut file under the chisel. This change in the direction of its movement is effected in the following manner:—When the carriage has moved forward as far as desired, the rod 31, is drawn forward to move the lever 32, in the proper direction to shift the clutch from the pulley 28, to the pulley 29, which is moving in the opposite direction, by the action upon a tappet 34, attached to said rod, of a tumbler 33, which works on a rockshaft 35, that is fitted to bearings 35*, at the front end of the bedplate. This tumbler 33, is attached to a sleeve 36, fitted to turn loosely upon said shaft 35, which sleeve has also attached two arms 37, 38, which are in the same plane perpendicular to the axis of the shaft. The tumbler 33, is brought suddenly into operation by the tripping over of an arm 39, which is attached to the sleeve 36, and loaded with a weight 40. This rod is in a nearly upright position, inclining slightly over toward the carriage D, while the latter is running forward, but at the proper time a plate 41, attached to the end of the carriage strikes the arm 37, of the tumbler-sleeve 36 and turns the tumbler so far as to carry the weight past its point of culmination, when it immediately falls, carrying with it the tumbler 33, and drawing forward the rod 31.

When the bed has been moved back by the belt 27, and pulley 29, nearly far enough to bring the file blank or partly cut file under the chisel, the cutter stock is lowered and the belt $w$, is shifted from the loose to the fast pulley to set the cutter in operation, and the ratchet feed motion is commenced again by the following means:—Y, is a lever working on the fixed stud 15, which serves as the axis of the cam W*, and fulcrum of the lever V, before described, and loaded with a weight Y*. This lever Y, during the time the carriage is being moved by the agency of the belts 26, 27, rests as shown in red outline in Fig. 4, upon a sliding spring bolt 46, which works through a guide 47, in the side of the bedplate. This bolt is furnished with a stud 48, working through a slot in the top of its guide, and this stud is connected by a rod 49, with a horizontal elbow lever 50, working on a fulcrum 51, secured in the bed-plate at the side of the carriage. The lever Y, is situated above a stud 52, which projects from the side of an arm 53, that is secured to one end of the shaft 35, before mentioned. The opposite end of the said shaft 35, has secured to it another arm 54, which is connected by a rod 55, with a lever 56, (Fig. 5) which works on the same fulcrum 16, as the lever S, before described. At the proper time the backward movement of the carriage D, brings a pawl 64, which is attached to the side of the said carriage, into operation on the lever 50, in such a manner as to cause the bolt 46, to be drawn from under the loaded lever Y, which is then caused to fall by gravitation, and in its descent to carry down the stud 52, and arm 53, from the position shown in red to that shown in black in Fig. 4, and thus turn the shaft 35, (which is independent of the tumbler before described) in a direction to throw forward the arm 54, and by that means (through the agency of rod 55,) to draw forward the lever 56, against a stud 58, on the lever S, and thus to move said lever S, so that it draws down the rod S'', and moves the lever U, and belt-shipper w', in a direction to ship the belt w, from the loose pulley on to the fast one. The lever S, by the same movement operates through the rod S', and rockshaft T, to raise the lever L''', of the ratchet sheath L'', and thus allow the pawl l', to come into gear with the ratchet wheel l, again. The lever Y, in its fall, acts on a stud 59, on the side of the cam W*, and drives the cam back from the position shown in red outline in Fig. 4, to that shown in black outline in the same figure; thus permitting the arm P' of the rockshaft P, to descend and bring the shoe down on the face of the blank or file, and allowing the loaded lever O, to act on the lever N, to force in the wedge to drive down the crosshead G, and bring down the cutter to its operative position or condition. The machine as now described operates as at first explained, and the cutting operation proceeds as before. As the carriage runs back, a hook on the plate 41, before described at the front end of the carriage takes hold of the arm 38, of the tumbler and raises the loaded arm 39, to the nearly upright position in which it was first described, so that it may be ready to operate again when the carriage has been run forward; and before the backward movement of the carriage has been completed, a pin 60, which is secured in the same side of the carriage as the pawl 58, and which, as the carriage travels, works in a slot in a rod 61, attached to an arm 62, on the shaft 35, comes to the end of the said slot, and, by the continued movement of the carriage, draws back the said arm 62, and thus turns the shaft 35, in a direction to raise the arm 53, which lifts up the lever Y, and to throw back the arm 54, which throws back the lever 56, clear of the stud 58, so that the lever S, may be left free to operate as before described when the carriage is run back far enough.

What I claim as my invention, and desire to secure by Letters Patent, is:

1. The wedge I, at the top of the toggle by which the cutter is operated, combined with a footpiece r, with its shoe r', resting upon the file-blank or file, by means of mechanism substantially such as described, and with a loaded lever O, or its equivalent, to operate as set forth for the purpose of controlling the depth of cut throughout the whole length of the file.

2. Supporting the file blank or file upon a rolling bed fitted to a carriage with rollers interposed in the maner substantially as set forth, for the purpose of insuring a uniform depth of cut all across the file.

3. The combination of the rocking shoe r', of the footpiece r, with the rolling bed E, substantially as and for the purpose set forth.

4. The cam W*, combined with the wedge I, footpiece r, and shoe r', by mechanism substantially as herein described, for the purpose of raising the cutter and the shoe r', of the foot-piece r, from the file or blank to prevent injury during its return.

J. NELSON JACOBS.

Witnesses:
 Lucius W. Pond,
 Wm. B. Howe.